(12) United States Patent
Schwartz

(10) Patent No.: US 12,103,615 B2
(45) Date of Patent: Oct. 1, 2024

(54) POWERED TRAILER

(71) Applicant: ELTRA Electric Trailers Corp., San Francisco, CA (US)

(72) Inventor: Brandon Schwartz, San Francisco, CA (US)

(73) Assignee: ELTRA Electric Trailers Corp., San Francisco, CA (US)

( * ) Notice: Subject to any disclaimer, the term of this patent is extended or adjusted under 35 U.S.C. 154(b) by 0 days.

(21) Appl. No.: 18/689,789

(22) PCT Filed: Dec. 8, 2023

(86) PCT No.: PCT/US2023/083082
§ 371 (c)(1),
(2) Date: Mar. 6, 2024

(87) PCT Pub. No.: WO2024/129531
PCT Pub. Date: Jun. 20, 2024

(65) Prior Publication Data
US 2024/0270335 A1    Aug. 15, 2024

Related U.S. Application Data

(60) Provisional application No. 63/432,214, filed on Dec. 13, 2022.

(51) Int. Cl.
*B62D 59/04* (2006.01)
*B60D 1/167* (2006.01)
(Continued)

(52) U.S. Cl.
CPC ............. *B62D 59/04* (2013.01); *B60D 1/167* (2013.01); *B60Q 1/508* (2022.05); *B60R 19/02* (2013.01);
(Continued)

(58) Field of Classification Search
CPC ........ B62D 59/04; B62D 9/002; B62D 12/02; B62D 63/062; B60D 1/167; B60Q 1/508; B60R 19/02
See application file for complete search history.

(56) References Cited

U.S. PATENT DOCUMENTS 7,156,433 B2    1/2007  Evans
9,740,213 B2 *  8/2017  Bick .................... G05D 1/0027
(Continued)

FOREIGN PATENT DOCUMENTS

DE    102021204001 A1    10/2022
EP        2 394 889 B1    11/2018

OTHER PUBLICATIONS

International Search Report for International Patent Application No. PCT/US2023/083082, dated Feb. 22, 2024.
(Continued)

*Primary Examiner* — Kevin Hurley
*Assistant Examiner* — Marlon A Arce
(74) *Attorney, Agent, or Firm* — Myers Wolin, LLC

(57) ABSTRACT

In some embodiments, a powered trailer is provided having a chassis, a fixation structure for fixing the chassis to a target vehicle to be pushed, a drive mechanism for applying motive force to the chassis, an energy source for powering the drive mechanism, and a controller for controlling the application of motive force to the chassis by the drive mechanism. The drive mechanism is actuated by the controller to push the target vehicle.

27 Claims, 9 Drawing Sheets

(51) Int. Cl.
  *B60Q 1/50*   (2006.01)
  *B60R 19/02*  (2006.01)
  *B62D 9/00*   (2006.01)
  *B62D 12/02*  (2006.01)
  *B62D 63/06*  (2006.01)

(52) U.S. Cl.
  CPC ............ *B62D 9/002* (2013.01); *B62D 12/02* (2013.01); *B62D 63/062* (2013.01)

(56) References Cited

U.S. PATENT DOCUMENTS

| | | | |
|---|---|---|---|
| 11,186,314 B2* | 11/2021 | Shoshan | B60D 1/62 |
| 2007/0241874 A1 | 10/2007 | Okpysh et al. | |
| 2019/0233034 A1* | 8/2019 | Viele | B60D 1/36 |
| 2020/0114993 A1* | 4/2020 | Beiler | B60K 17/14 |
| 2022/0097524 A1* | 3/2022 | Choi | B60K 35/00 |
| 2023/0348000 A1* | 11/2023 | Laine | B62D 59/04 |
| 2024/0151547 A1* | 5/2024 | Stout, II | B62D 13/005 |

OTHER PUBLICATIONS

Lienert et al.: "Focus: Next step for EVs: Design batteries to strengthen car, extend range," Reuters, Jul. 23, 2021, [https://www.reuters.com/business/autos-transportation/next-step-evs-design-batteries-strengthen-car-extend-range-2021-07-23/], retrieved from the Internet on Feb. 14, 2024.

* cited by examiner

POWERED TRAILER

CROSS REFERENCE TO RELATED APPLICATIONS

This application is a U.S. national stage entry, under 35 U.S.C. § 371, of International Application No. PCT/US2023/083082, filed Dec. 8, 2023, which takes priority from U.S. Provisional Application No. 63/432,214 filed Dec. 13, 2022, the entire contents of each of which are incorporated by reference herein.

FIELD OF THE INVENTION

The disclosure relates to powered trailers for pushing a target vehicle. In particular, the disclosure relates to powered trailers which may actively push legacy internal combustion vehicles or electric vehicles, thereby increasing power, efficiency, or range of the target vehicle.

BACKGROUND

Large numbers of vehicles utilize internal combustion engines (ICE) for propulsion. Such vehicles often are inefficient, and generate pollution when used. While modern electric motors may be more efficient, it is impractical to replace existing fleets of otherwise functional vehicles over a short period of time.

There is a need for a secondary drive utilizing electric motors that can be easily retrofit to legacy vehicles in order to enhance range or efficiency of the target legacy vehicles.

Further, existing electric vehicles may have limited range. Accordingly, a secondary drive that can enhance range of a target legacy vehicle may similarly extend the range of an existing electric vehicle.

SUMMARY

Embodiments are provided for powered trailers, typically battery electric trailers, that can safely push legacy vehicles, including internal combustion engine or electric vehicles. This would achieve increased gas-mileage or range, and may thereby lower cost of operation and reduce fossil fuel consumption. Additional use cases may include adding or reallocating "surge capacity."

Additional safety improvements and network effects may provide further benefits relative to status quo. Additional features may also be enabled by the trailer's upright configuration, and mass/momentum-balancing algorithms.

Benefits to individual vehicles are obvious. With an electrically-powered motor pushing the legacy vehicle, the internal combustion engine does not need to work as hard. This would allow hybrid electrification of legacy fleets of vehicles. Note that in many embodiments, the trailer is not for cargo—it does not hold anything but its own power source and may be engineered to dynamically apply torque and power as needed to remain stable.

Similarly, the range of the vehicle (gas or electric) could be extended by such a trailer. Additionally, electric powered trailers allow users to add power to their existing vehicle for special use cases. For example, a consumer might own a boat and "need" (desire to purchase or keep) a large pickup truck or a long-range high energy vehicle (electric SUV) for the infrequent times the boat is used. In the alternative with powered trailers for rent, the customer could be satisfied with a small vehicle and count on renting an additional "booster" when the need arises.

Furthermore, such a trailer would be useful to reduce the fuel consumption of vehicles that are often starting up from a standstill. Because electric motors can provide low-speed and high-torque power, the trailer could provide high-power momentum transfer to the vehicle in the very state where internal combustion engines are inefficient. For example, accelerating from a standstill in stop-and-go traffic.

Additionally, such a device would be useful for being able to recover, by regeneration, some of the energy that would otherwise be lost to braking, whether in normal traffic, or in mountainous areas where downhills are long or steep.

Further, the powered trailer may provide extra traction on the roadway, thereby increasing safety of, for example, trucks driving in winter conditions in the mountains.

An embodiment could be provided with intelligence such that the trailer can be programmed not only to push a vehicle, but to change and steer a given vehicle's center of gravity and momentum, computed by algorithm. For example, a heavy truck going around a curve could be supported more on the outside of the curve than the inside, thus moving the center of gravity of the truck more towards the inside wheels, thus causing the truck to be less likely to tip over due to centrifugal force. Equivalently, some curves may then be taken safely at higher speeds.

Such a robotic powered trailer may then be programmed to and designed to (a) attach to a vehicle while underway (i.e., roll up to a moving vehicle from behind and start pushing, safely) and (b) absorb the momentum transfer when being run into from behind (as in entering a convoy bumper-to-bumper). With the ability to manipulate the center of gravity of the vehicle ahead and to mediate, absorb, and redistribute any inter-vehicle forces from behind, the trailer-robot could enable a convoy (car-trailer-car) to grow while remaining relatively safe, and an efficient very long convoy is possible, among even arbitrary legacy, unrelated vehicles.

In some embodiments, the trailer is envisioned to have laterally separated points of attachment for high sensitivity and dynamic response, and a relatively wide and tall, but short aspect ratio; the envelope is envisioned to be slightly smaller than the width and height of a target vehicle. However, the length of the trailer, in some embodiments, is envisioned to be very short, perhaps only as long as 2 wheel-widths. It is envisioned in the general use case to have a single axle balancing a heavy stack of batteries, motors, and other systems. It may have an appearance, for example, of a "book on wheels." There are aerodynamic, thermodynamic, and social considerations to adopting this form factor.

The trailers are envisioned as being able to "gang" or convoy, with multiple trailers pushing a single vehicle. Additionally, the trailers are envisioned as being able to fit & "ride" comfortably between two vehicles, saving gas mileage for both vehicles (and perhaps regenerating slowly to boot).

Part of the vertical envelope will be used for cooling and this may be combined with see-through display of text/simple images (warnings, messages, condition status could be coded and viewed by side-view or rear-view mirrors/camera, etc).

In further refinement, the trailer might permit dynamic load shifting of its center of gravity and center of effort. This might increase the safety and/or performance of the lead/towing/pushed vehicle, by changing its center of gravity as well.

In another refinement, the trailer might encourage other non-connected, unrelated vehicles to "Go ahead and ride my bumper" thereby reducing the wind resistance of the unrelated trailing (bumpering) vehicle, while providing some regenerative charging to the trailer. The front vehicle (with trailer physically attached) would still control the speed & direction. This might benefit both the front vehicle which is being pushed additionally from behind, and the rear vehicle which does not have to fight wind resistance. In this conception, the trailer enables road vehicles to do so-called "convoying" in an optimally-spaced train-like configuration.

An advantage of this technology is that control is maintained by the driver of the vehicle being pushed. The trailer should not be able to provide more power than is safe, but rather, for example, make a heavily-loaded cargo van drive like it were empty. Relying on a driver eliminates a lot of the difficulty of control systems for the trailer.

Another advantage is that this is an "enabling technology" that may allow the socialization of transportation to be efficiently coordinated among independent cars. As such, embodiments of the trailers disclosed herein may leverage network effects.

If vehicles are convoyed (physically touching and transmitting forces intermittently to both front and back bumpers) the networked "smarts" of the trailers in the convoy (there may be several) can maintain steadying forces to equalize momenta between vehicles. The safety factor of coordinating the momentum cannot be quantified but may be a social benefit of the technology if it enables socialized use of the public roadways.

If all trailers are network— aware and destinations are known, near-optimal route convoying can be achieved.

Another key advantage of this technology is that it encourages wide deployment of useful concentrated energy sources generally. The trailers can carry power from the grid to remote areas or vice-versa.

Part of the conception involves the fact that the trailer is necessarily heavy and has a single highly loaded axle. Another part of the conception involves the trailer using two widely-spaced points of contact.

In some embodiments, a powered trailer is provided having a chassis, a fixation structure for fixing the chassis to a target vehicle to be pushed, a drive mechanism for applying motive force to the chassis, an energy source for powering the drive mechanism, and a controller for controlling the application of motive force to the chassis by the drive mechanism. The drive mechanism is actuated by the controller to push the target vehicle.

In some embodiments, the energy source is a battery. In some such embodiments, the battery is a structural component of the chassis.

In some embodiments, the drive mechanism includes at least one wheel driven by at least one motor. In some such embodiments, the at least one wheel is a plurality of wheels on a single axis.

In some embodiments, the fixation structure is a rigid structure for applying the motive force to the target vehicle. In some such embodiments, the fixation structure rigidly fixes the chassis to the target vehicle by way of a trailer hitch of the target vehicle.

In some such embodiments, the fixation structure further comprises at least one rigid extension extending in opposite directions from the trailer hitch perpendicular to a direction of force application, such that an application of force by the fixation structure is at two contact points offset relative to the trailer hitch in opposite directions.

In some embodiments where the fixation structure is a rigid structure, the fixation structure has at least two contact points for contacting corresponding contact points of the target vehicle. The at least two contact points are spaced apart. In some such embodiments, the contact points of the target vehicle are linked to and offset relative to the trailer hitch in opposite directions.

In some embodiments utilizing at least two contact points, the controller allocates force dynamically between the contact points.

In some such embodiments, the drive mechanism comprises at least two wheels along a single axle, and the controller allocates force by controlling the motive force applied by each of the at least two wheels independently.

In some embodiments, the fixation structure includes a universal attachment at each of the contact points for gripping a structural member of the target vehicle. In some such embodiments, the universal attachment is a gripping clamp.

In some embodiments, the fixation structure includes at least two contact points for contacting corresponding contact points of the target vehicle. The contact points are spaced apart, and the fixation structure further includes articulated arms linking the contact points to the chassis.

In some embodiments, the fixation structure includes at least two contact points for contacting corresponding contact points of the target vehicle. The contact points are spaced apart, and the fixation structure includes at least one shock absorber for absorbing impact between the chassis and the target vehicle.

In some embodiments, the drive mechanism is actuated by the controller based on a detected behavior of the target vehicle.

In some such embodiments, the drive mechanism is actuated by the controller upon determining that the target vehicle is accelerating.

In some embodiments in which the drive mechanism detects behavior of the target vehicle, the drive mechanism is actuated by the controller upon determining that the target vehicle is applying engine force to maintain a constant speed.

In some embodiments in which the drive mechanism detects behavior of the target vehicle, the drive mechanism is deactivated upon determining that the target vehicle is under braking force.

In some embodiments in which the drive mechanism detects behavior of the target vehicle, the controller receives information related to the behavior of the target vehicle by way of a communication interface.

In some such embodiments, the communication interface comprises a trailer hitch of the target vehicle.

In some embodiments utilizing a communication interface, the communication interface is controlled by a driver of the target vehicle.

In some embodiments utilizing a communication interface, the communication interface includes sensors for detecting pedal positions associated with a control system for the target vehicle.

In some embodiments utilizing a communication interface, upon receipt of information from the communication interface indicating that brakes of the target vehicle have been activated, the controller disengages the drive mechanism.

In some embodiments utilizing a communication interface, the drive mechanism further comprises at least one wheel and a generator, and upon determining that motive force is not to be applied to the chassis, the at least one wheel drives the generator to add power to the energy source.

In some embodiments in which the drive mechanism detects behavior of the target vehicle, the controller determines the behavior of the target vehicle based on inertial changes detected at the fixation structure.

In some embodiments, the drive mechanism is actuated by the controller based on input from a user.

In some embodiments, the powered trailer includes a trailer hitch such that a secondary trailer fixed to the trailer hitch is pulled by either the chassis or the target vehicle by way of the chassis.

In some embodiments, the powered trailer includes a rear bumper for allowing impacts between the trailer and a following vehicle.

In some such embodiments, the rear bumper further comprises a gripping mechanism for gripping a following vehicle after impact and retaining the following vehicle in a convoy.

In some embodiments utilizing a bumper, upon impact with a following vehicle, compensating force is applied to the drive mechanism to allow for power generation, and wherein any power generated is added to the energy source.

In some embodiments, the trailer includes at least one housing, the at least one housing enclosing at least a portion of the energy source or the chassis.

In some such embodiments, the housing has a size or shape selected based on characteristics of the target vehicle.

In some such embodiments, the housing has a height selected based on a height of the target vehicle and a width selected based on a width of the target vehicle.

In some such embodiments, the housing has a depth smaller than the height of the housing, and wherein the trailer has a drive mechanism comprising wheels on a single axle.

In some such embodiments, a location of a center of gravity of the trailer relative to the single axle defines a lean angle for the at least one housing, and wherein the lean angle is controllable by the controller.

In some such embodiments, a location of the center of gravity along the single axle defines a roll angle for the at least one housing, wherein the roll angle is controllable by the controller.

In some embodiments utilizing a movable center of gravity, the fixation structure comprises at least one articulated arm, and wherein the at least one articulated arm is actuated to define the lean angle.

In some embodiments where a housing has a size selected based on a target vehicle, the housing includes at least one air intake, and the at least one air intake receives airflow from a wake of the target vehicle.

In some such embodiments, the powered trailer includes at least one power generator for generating power for the energy source, and the air intake supplies the power generator with a motive force for driving the power generator.

In some embodiments utilizing an air intake, the controller derives a behavior of the target vehicle based on sampled airflow at the at least one air intake.

In some embodiments utilizing an air intake, the air intake is located relative to the target vehicle such that airflow passing the target vehicle is received by the air intake.

In some embodiments, the powered trailer includes at least one dynamic ballast mechanism for moving a center of gravity of the powered trailer.

In some such embodiments, the dynamic ballast mechanism moves the center of gravity of the powered trailer upon detecting acceleration or braking in the target vehicle.

In some embodiments using a dynamic ballast mechanism, the dynamic ballast mechanism comprises a track for retaining and controlling the location of a movable ballast. In some such embodiments, the movable ballast is at least a portion of the energy source.

In some embodiments using a dynamic ballast mechanism, the drive mechanism includes a plurality of wheels on a single axle, and the dynamic ballast mechanism moves the center of gravity of the powered trailer in a direction of the single axle. The controller then actuates movement of the center of gravity upon detecting an upcoming turn. In some such embodiments, the upcoming turn is detected by a navigation system.

In some embodiments in which the dynamic ballast moves in the direction of the axle, the fixation structure is a rigid structure having at least two contact points for contacting the target vehicle, and the contact points are spaced apart. The detection of an upcoming turn is then based on a force differential between the two contact points.

In some embodiments in which the dynamic ballast moves in the direction of the axle, the fixation structure comprises at least one articulated arm, the articulated arm being actuated to define a lean angle of the powered trailer. The dynamic ballast mechanism then moves the center of gravity of the powered trailer in the direction of the single axle, and the articulated arm moves the center of gravity of the trailer in a direction perpendicular to the single axle.

In some embodiments, the chassis is self balancing.

In some embodiments, the powered trailer includes at least one solar cell for charging the energy source.

In some embodiments, the chassis further includes an airflow sensor for sampling airflow passing the trailer for data acquisition.

In some embodiments, the drive mechanism is actuated by the controller based on at least one signal generated by at least one sensor, suite of sensors, or camera mounted on the chassis. In some such embodiments, the controller evaluates the at least one signal using machine learning algorithms.

In some embodiments, the powered trailer includes a rear facing display for communicating with following vehicles.

In some such embodiments, the rear facing display presents messages in support of convoying behavior.

In some embodiments utilizing a rear facing display, the rear facing display presents information related to traffic conditions ahead of the target vehicle.

DETAILED DESCRIPTION OF THE PREFERRED EMBODIMENTS

Figure 1:
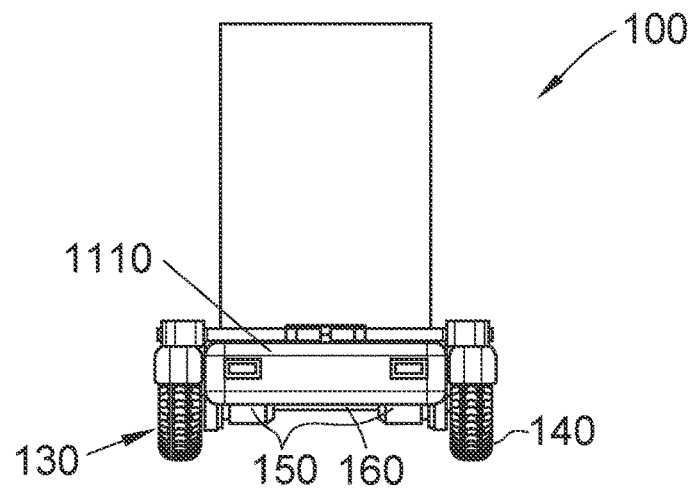
FIG. 1 is a rear view of an embodiment of a powered trailer in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Various embodiments of a powered trailer are described herein. Generally, such a powered trailer may be used to push a target vehicle and may function as a robot. In many embodiments, the powered trailer is a self-balancing robot, which can then deliver or retrieve momentum based on a control algorithm. In practice, this means being able to speed up, slow down, lean forward, lean back, apply upwards or downward force, and apply roll and yaw controls. Such various controls may be provided in some embodiments and not others, and the different embodiments described may be "self-balancing" to different extents.

Figure 2:
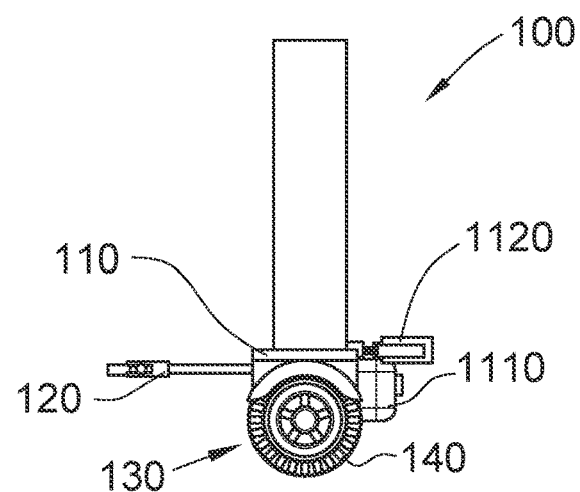
FIG. 2 is a side view of the embodiment of FIG. 1.
Figure 3:
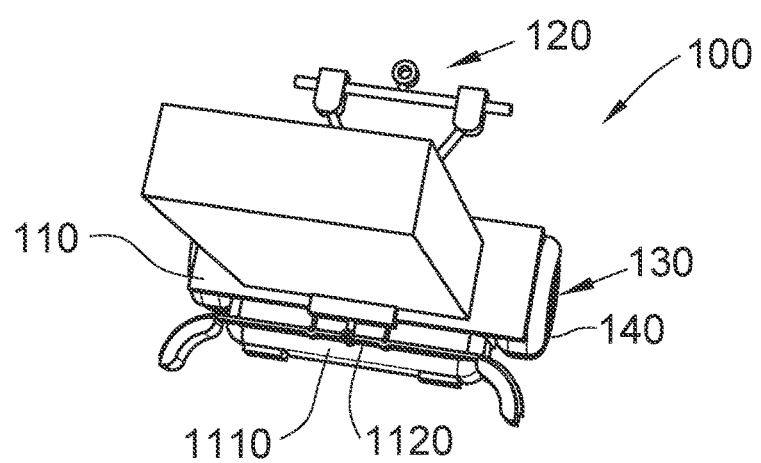
FIG. 3 is a top perspective view of the embodiment of FIG. 1.

FIG. 1 is a rear view of an embodiment of a powered trailer 100 in accordance with this disclosure. FIG. 2 is a side view of the embodiment 100 of FIG. 1. FIG. 3 is a top perspective view of the embodiment 100 of FIG. 1.

Figure 4:
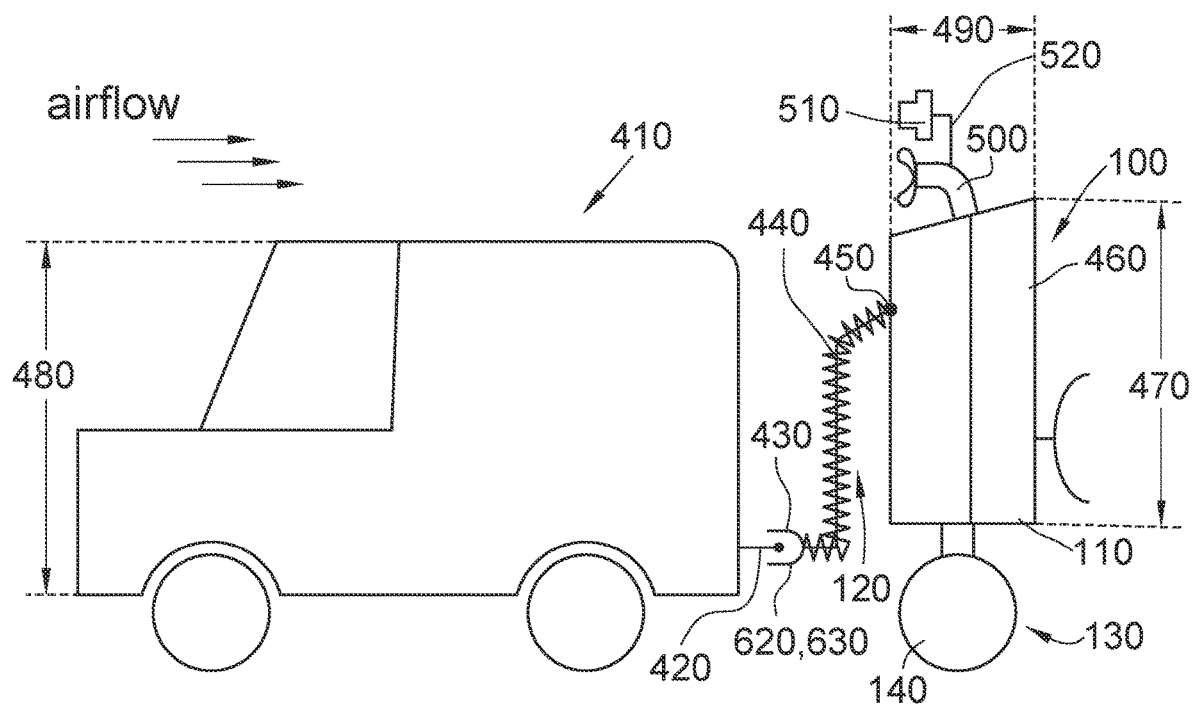
FIG. 4 is a drawing of an embodiment of a powered trailer in accordance with this disclosure.

FIG. 4 is a drawing of an embodiment of a powered trailer 100 in accordance with this disclosure and paired with a target vehicle 410 to be pushed.

Figure 5:
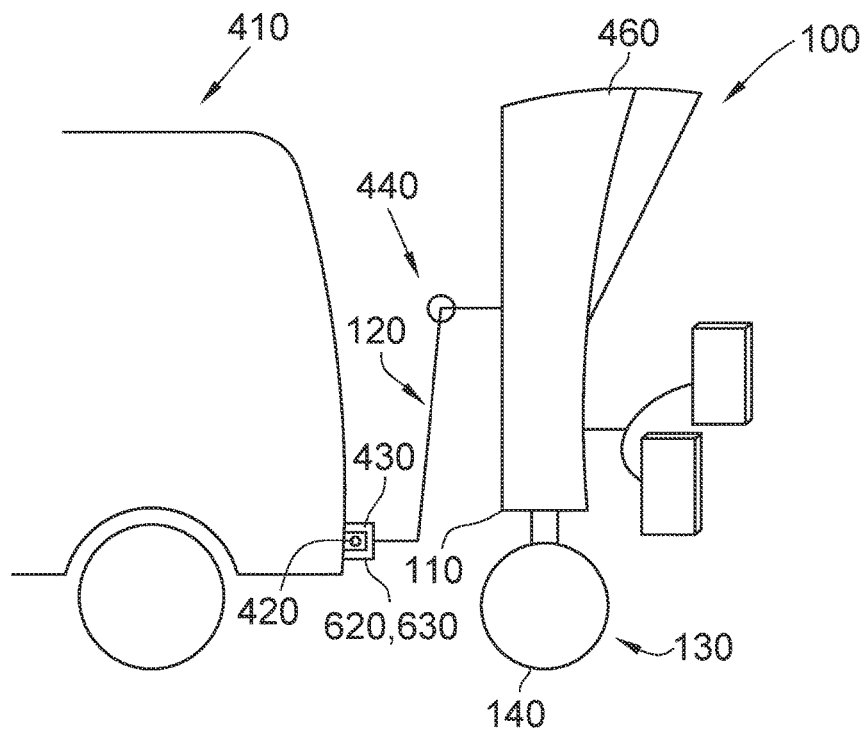
FIG. 5 is a drawing of an embodiment of a powered trailer in accordance with this disclosure.

FIG. 5 is a drawing of an embodiment of a powered trailer 100 in accordance with this disclosure and paired with a target vehicle 410 to be pushed.

Figure 6:
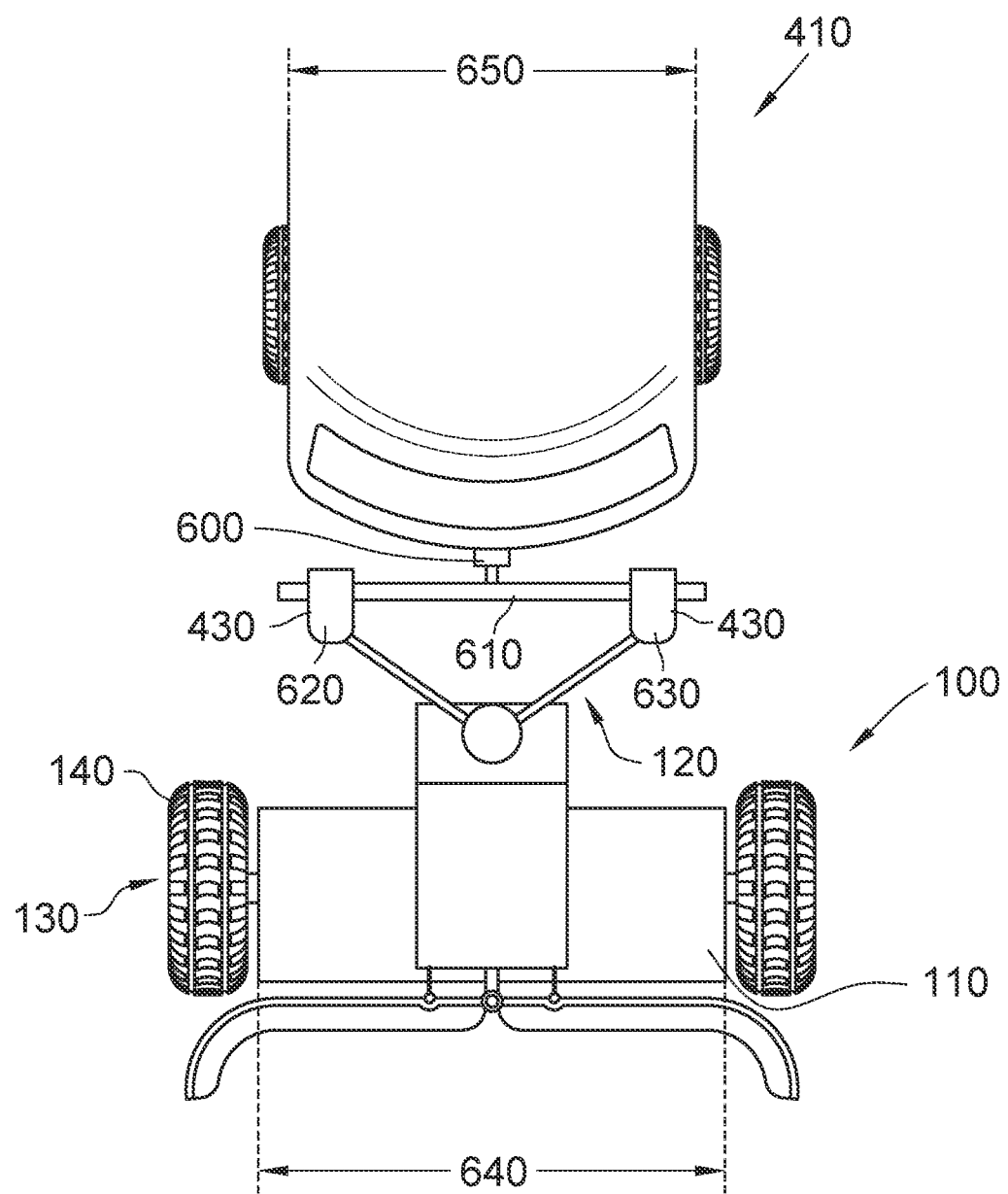
FIG. 6 is a drawing of a top schematic view of a powered trailer in accordance with this disclosure.

FIG. 6 is a drawing of a top schematic view of a powered trailer 100 in accordance with this disclosure and paired with a target vehicle 410 to be pushed.

Figure 7:
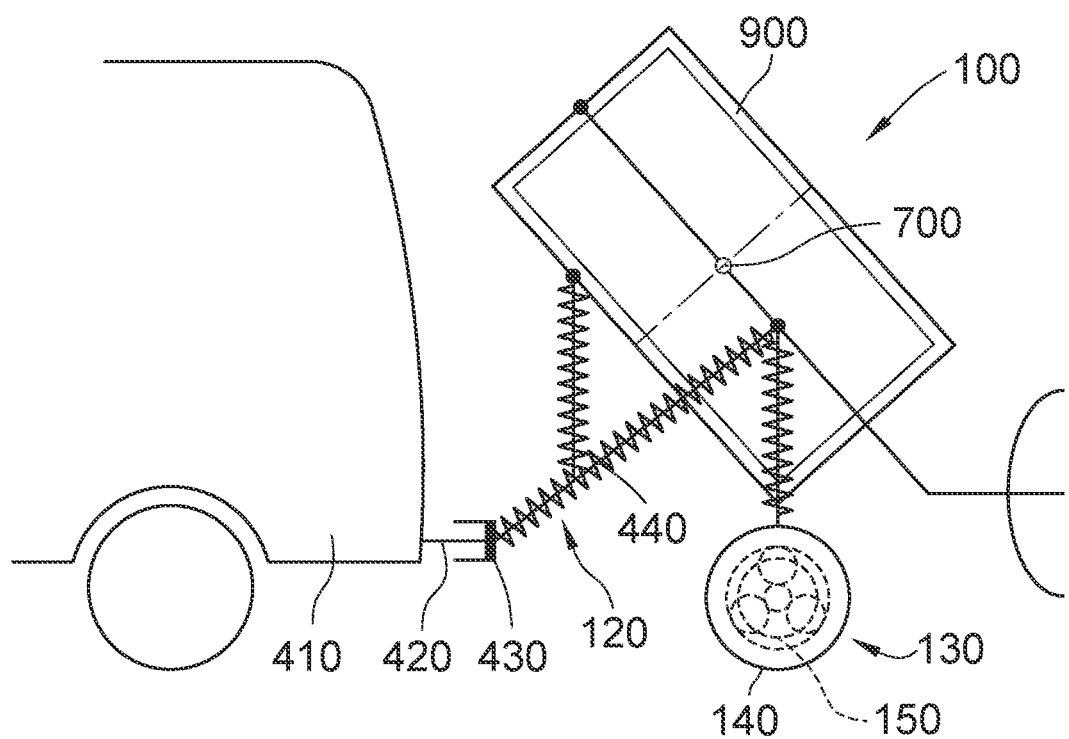
FIG. 7 is a side view of an embodiment of a powered trailer in accordance with this disclosure.
Figure 8:
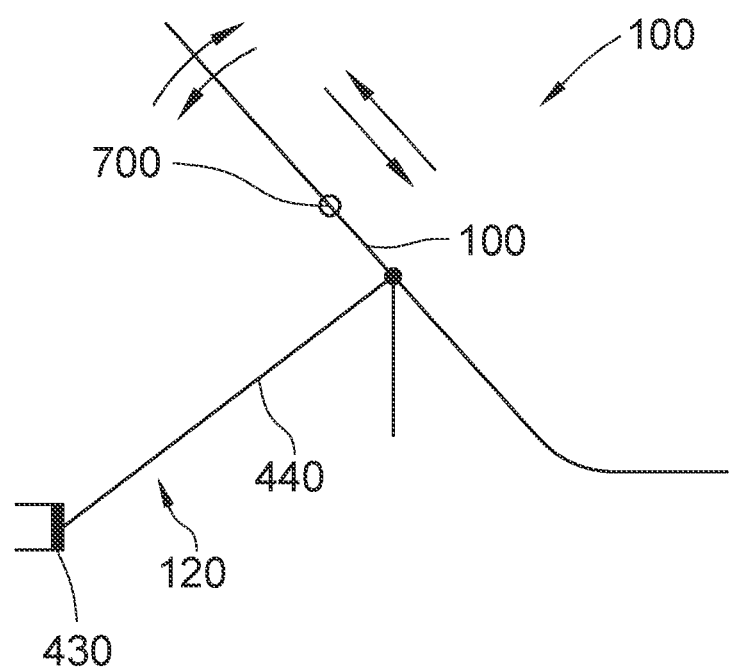
FIG. 8 is a schematic view of the embodiment of FIG. 7.
Figure 9:
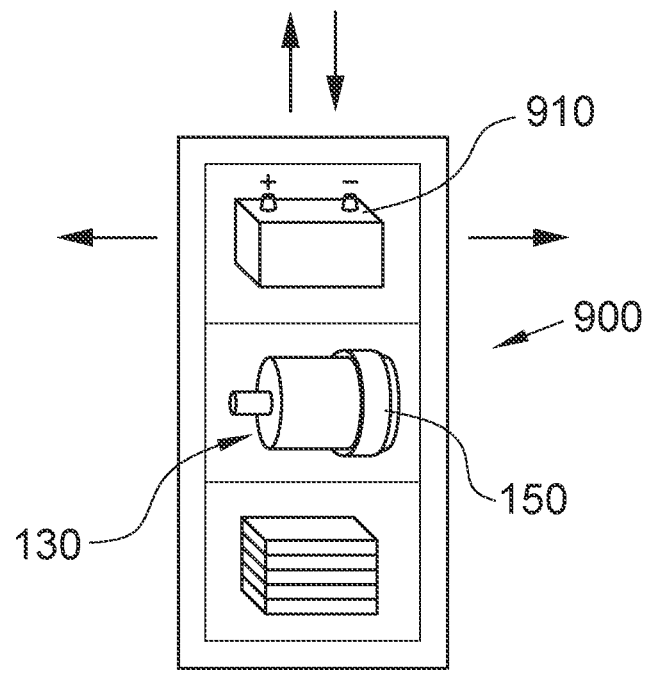
FIG. 9 is a schematic view of a movable ballast component for use in a powered trailer in accordance with this disclosure.

FIG. 7 is a side view of an embodiment of a powered trailer 100 in accordance with this disclosure. FIG. 8 is a schematic view of the embodiment 100 of FIG. 7. FIG. 9 is a schematic view of a movable ballast component 900 for use in a powered trailer 100 in accordance with this disclosure.

As shown, the various embodiments of the powered trailer 100 have a chassis 110, a fixation structure 120 for fixing the chassis 110 to a target vehicle 410 to be pushed, a drive mechanism 130 for applying motive force to the chassis 110, and an energy source, such as a battery 910. Alternatively, the energy source may take different forms as well, such as fuel cells or solar cells.

A controller, not shown, is provided for controlling the application of motive force to the chassis 110 by way of the drive mechanism 130. Typically, the drive mechanism 130 is then actuated by the controller to push the target vehicle 410.

In some embodiments, the energy source, or battery 910, is a structural component of the chassis 110. In such embodiments, the battery 910 may be located so as to provide an ideal weight balance within the powered trailer 100, and it may be incorporated in such a way as to increase structural rigidity of the chassis 110. In other embodiments, discussed in more detail below, the battery 910 is deliberately not incorporated into the chassis, so as to be used as a portion of a movable ballast 900, thereby increasing the mass associated with such a ballast.

The drive mechanism 130 can comprise a number components, including at least one wheel 140 driven by at least one motor 150. The at least one wheel 140 may be a plurality of wheels on a single axle 160, such that the powered trailer 100 has a single axle configuration. Such a configuration may result in an upright configuration, as shown herein, which utilizes various techniques to maintain proper balance. Alternatively, the powered trailer 100 may have a traditional trailer configuration with the single axle located at or adjacent one end of the trailer, while the second end is hitched to the target vehicle 410 or otherwise fixed to the target vehicle by way of the fixation structure 120.

It is noted that the disclosure generally discusses wheeled implementations. It will be understood that drive mechanism 130 may similarly comprise other means for applying motive forces to the ground, such as tread configurations or "feet" type structures, as well as jet/rocket engines, traction mechanisms, and other drive mechanisms. Similarly, specialty wheel configurations may be driven as well. For example, for use in a snowy mountain pass, four special purpose wheels arranged in a cylinder or drum-like configuration may be used for extra traction.

While a single motor 150 is shown integrated into the ballast 900, it will be understood that various motor configurations are contemplated. For example, a single motor 150 may be utilized to drive all wheels 140 associated with the drive mechanism 130, but may instead be fixed to the chassis 110 in order to improve stability. Alternatively, a separate motor 150 may be applied to, integrated into, or mounted adjacent, each wheel 140.

Accordingly, each wheel could be driven independently, thereby eliminating the need for a functional axle. It is therefore noted that while an axle 160 is indicated and shown linking the wheels 140, such an axle may be nonfunctional, where each wheel is independently driven, or it may be eliminated entirely where each wheel 140 is integrated into a drive unit fixed directly to the chassis. Accordingly, references to axles 160 may be understood as referencing wheels 140 provided with a single axis of rotation. In this manner, the "axle" 160 may be a virtual axle representing multiple wheels having a common rotational axis.

The fixation structure 120 is generally a rigid or rigidly positionable structure for applying motive force from the powered trailer 100 to the target vehicle 410. Such a fixation structure may thereby rigidly fix the chassis to the target vehicle 410 in a variety of ways. In some embodiments, the fixation structure may rigidly fix the chassis 110 to the target vehicle 410 by way of a trailer hitch 600 of the target vehicle 410.

In such embodiments, techniques may be utilized to offset force application from the powered trailer 100 to the target vehicle 410 horizontally such that force is applied in a controlled manner on two sides of the trailer hitch 600. As such, in some embodiments, the fixation structure 120 may include at least one rigid extension 610 extending in opposite directions from the trailer hitch 600. Such a rigid extension 610 may extend perpendicular to a direction of force application from the powered trailer 100 such that an application of force by the fixation structure 120 is at two contact points 620, 630 offset relative to the trailer hitch 600 in opposite directions.

Typically, the trailer hitch 600 of the target vehicle 410 may be integrated into a chassis or frame of the target vehicle or may otherwise be structural. As such, the trailer hitch 600 may be a sturdy connection point by which to push the target vehicle 410 or, in some instances, pull the powered trailer 100. However, pushing the target vehicle 410 at a single central location may lead to instability in the system of the powered trailer 100 and the target vehicle 410 taken as a whole.

Accordingly, in some embodiments, as discussed below, a sturdy component of the target vehicle 410 may be used as a force application location 420. Such a force application location may be, for example, a rigid bumper or a rear underride guard of a truck. As such, the fixation structure 120 may utilize a universal fixation element, such as a gripping clamp 430 in order to grasp the force application location 420 firmly, such that the force application location 420 can be used to push the target vehicle 410 or pull the powered trailer 100. Such a rigid force application location 420 may then allow for multiple gripping clamps 430 offset from the center of the target vehicle, thereby stabilizing the system taken as a whole. The gripping clamps 430 may comprise jaws that apply a compression force to grasp the force application location 420.

In addition to clamps, various other components may be used in the fixation structure 120. For example, the interface may comprise pincers or prongs, as well as pads, bolts, clamps, suction cups, adhesives, etc. Accordingly, while the fixation structure 120 itself may be rigid or rigidly positionable, it may include segments or components designed to absorb shock and pad impacts.

However, in some target vehicles 410, rigid force application locations 420 may not be available, as the bumper may be designed to collapse upon the application of a force smaller than that applied by the powered trailer 100 as a matter of course. In other target vehicles, the bumper may be integrated into the vehicle 410 or otherwise not available for grasping. Accordingly, the optional rigid extension 610 may be used when the trailer hitch 600 is available as the best structural component for fixation. Accordingly, the same overall structure for the fixation structure 120 may be provided, while the rigid extension 610 provides an ideal force application location 420 for use with the fixation elements 430. In some embodiments, the clamps 430 may be used generally, while a different connection type is used with the rigid extension 610, thereby allowing for a more direct fixation element. However, as shown, the clamps 430 may be used to grasp the rigid extension 610 as well.

Alternatively, in some embodiments, vehicle specific attachment components may be provided. Such components may replace, for example, the gripping clamps 430, and may be available for a specified vehicle to be used as the target vehicle 410.

Accordingly, in the embodiment shown, the fixation structure 120 generally comprises at least two contact points 620, 630 for contacting corresponding contact points 640, 650 of the target vehicle 410. The two contact points 620, 630 of the fixation structure 120 are typically spaced apart, as shown, and may be linked by a yoke. However, it is understood that embodiments comprising a single contact point, such as a more direct connection to the trailer hitch 600 of the target vehicle 100 are contemplated. In such embodiments, the rigid extension 610 may be integrated into the fixation structure 120, or the offsets may be omitted altogether.

In embodiments with offset contact points 620, 630, the controller may be used to allocate force dynamically between the contact points. In this way, the controller may actively control the application of force by the drive mechanism 130 so as to enhance stability of the system as a whole.

Such dynamic force allocation may be applied, for example, by controlling the drive mechanism 130 directly. For example, the drive mechanism 130 may comprise at least two wheels 140 along a single axle/axis 160. The controller may then allocate force by controlling the motive force applied to each of the at least two wheels independently. This may be by utilizing a differential, for example. Accordingly, in this manner, force allocation may be used to counteract a camber in a road or a detected turn in the path of travel. This may be, for example, by way of torque vectoring techniques.

It is noted that a differential may be used in the context of a true axle 160. However, as discussed above, where the wheels 140 are independently driven by corresponding motors 150, no such differential is necessary, and the controller may directly control a speed for each wheel. In the embodiments shown, two wheels 140 are provided. However, it is understood that additional wheels 140 may be provided along the single axis of rotation, represented by the single axle 160. Such additional wheels may, for example, be provided in pairs driven together.

In many embodiments, the fixation structure 120 comprises at least two contact points 620, 630 as shown. As noted above, the contact points 620, 630 are typically spaced apart horizontally in order to enhance stability. In some such embodiments, the fixation structure 120 further comprises articulated arms 440 linking the contact points 620, 630 to the chassis 110. Such an articulated arm may allow for a vertical offset between a contact point 450 between the fixation structure 120 and the chassis 120 and the contact points 620, 630 of the fixation structure 120. This allows the fixation structure 120 to be adjustable for a wide variety of target vehicles 410. Such an articulated arm may also include wrist components, elbows, offsetting arms, as well as shoulders, thereby providing degrees of motion in various ways. A control algorithm may then track orientation, spatial distances, and, in some embodiments, rates of change between those various components, thereby allowing for a complete coordinating system.

Further, as discussed in more detail below, the articulated arms 440 of the fixation structure 120 may allow for a dynamic relationship between the powered trailer 120 and the target vehicle 410. This may be utilized in a wide variety of ways, such as in controlling a location of a center of mass of the vehicle-trailer system. In some embodiments, the articulated arms 440 may be configured to function as a rigid fixation structure 120 in most scenarios, while in other embodiments, the articulated arms 440 may be utilized as shock absorbers, dynamic adjustments, or may simply provide some play in the system. However, in all embodiments, the fixation structure 120 is utilized to apply the motive force generated by the drive mechanism 130 to the target vehicle 410.

In some embodiments, the fixation structure comprises at least one shock absorber for absorbing an impact between the chassis 110 and the target vehicle 410. As noted above, this may be integrated into the articulation of articulated arms 440. Alternatively, it may be integrated into a more traditional rigid connection, such as by using a standard shock absorber oriented linearly in the direction of travel. Alternatively, such a shock absorber may be similar to standard trailer shock absorbers and may be integrated at the chassis 110 or at the hitch 600 in addition to at the fixation structure 120.

In some embodiments, the drive mechanism 130 is actuated by the controller based on a detected behavior of the target vehicle 410. For example, the drive mechanism 130 may be actuated by the controller upon determining that the target vehicle 410 is accelerating. Similarly, the drive mechanism 130 may be actuated by the controller upon determining that the target vehicle 410 is applying engine force to maintain a constant speed. Accordingly, in such a scenario, a target vehicle 410 traveling on a highway may receive a push from the trailer 100 to reduce the engine load on an ICE while maintaining a constant speed.

Variations of this approach may be used as well. For example, the powered trailer 100 may provide X % of engine power at all times, regardless of the ICE power. Such a proportional control scheme has a benefit of relative simplicity. Similarly, the torque applied by the powered trailer 100 may be based on a lookup table tied to information acquired from sensors.

In some embodiments, the drive mechanism 130 is deactivated by the controller upon determining that the target vehicle 410 is under braking force. In some such embodiments, in addition to or instead of deactivating the drive mechanism 130, the drive mechanism may include a generator and may be switched to a regeneration mode. Accordingly, the drive mechanism 130 may provide a braking force for the system while simultaneously generating some power to be added to the power source 910.

In some embodiments, the controller receives information related to the behavior of the target vehicle 410, or an expected behavior of the powered trailer 100, by way of a communication interface. Such a communication interface may comprise a trailer hitch 600 of the target vehicle 410, as trailer hitches may be configured to provide information related to light activations and braking performed by the target vehicle.

Alternatively, or in addition to a trailer hitch 600 based communication interface, an interface may be controlled by a driver or passenger of the target vehicle 410. In some embodiments, the communication interface may comprise sensors for detecting pedal positions associated with a control system for the target vehicle 410. Similarly, the communication interface may be integrated into a system controlling aspects of the target vehicle 410 and may comprise information related to force application and turning inputs of the target vehicle.

Accordingly, the determination discussed above that the target vehicle 410 is under braking force may be based on the receipt of information from the communication interface indicating that brakes of the target vehicle have been activated. As such, the controller may disengage the drive mechanism. Alternatively, the drive mechanism may comprise at least one wheel 140 and a generator, and upon determining that motive force is not being applied to the chassis 110, or that braking force is being applied to the target vehicle 410, the wheel 140 drives the generator to add power to the energy source 910.

In some embodiments, the controller determines the behavior of the target vehicle 410 based on inertial changes detected at the fixation structure 120. As noted above, the fixation structure 120 may comprise articulated arms 440. Such arms 440 may then include force sensors at the articulation, thereby transmitting information about inertial changes of the target vehicle. Rigid fixation structures 120 without such articulation may similarly provide force sensors. Such sensors may be applied, for example, at the gripping clamps 430, the jaws of such clamps, or at a yoke controlling a relationship between those clamps.

In such an embodiment, for example, when the target vehicle 410 applies braking force, force sensors in either the gripping clamps 430 or the articulated arms 440 would detect a positive force between the vehicles. Similarly, when the target vehicle 410 is under an accelerating force, a negative force would be detected. Similarly, because the gripping clamps 430, and to a lesser extent, the articulated arms 440 are offset from each other, two force sensors offset from each other can detect force differentials, which would indicate a turn by the target vehicle 410.

In some embodiments, discussed in more detail below, additional sensors may be provided for detecting behaviors of the target vehicles. Such sensors may be, for example, airflow sensors 500 sampling airflow in the wake of the target vehicle 410. In some embodiments, such sensors may be one or more camera 510, or one or more camera may be provided in addition to the sensor. Such a camera may be provided with an upright orientation, or may extend from sides of the powered trailer, so as to see over or around the target vehicle 410. Similarly, the camera may extend from a mast 520 or may be provided with a periscope functionality in order to see over traffic. In this manner, the powered trailer may be able to evaluate future traffic flow situations in order to adapt accordingly and/or relay messages to vehicles behind.

In some embodiments, the powered trailer may be provided with a rear facing display so as to communicate with following traffic and/or drivers. In some such embodiments, messages may be provided on the display based at least partially on the traffic situation ahead of the powered trailer, which may be derived from sensor and camera feedback.

In some embodiments, the actuation of the drive mechanism is at least partially based on a mass of the target vehicle 410 and any load carried by the target vehicle. Accordingly, the controller may be tuned based on such information.

In some embodiments, less sophisticated control schemes may be utilized as well. For example, in some embodiments, the drive mechanism 130 may be actuated by the controller based directly on input from a user. Such a configuration may be utilized, for example, for low-speed maneuvers requiring low speeds and high torque where an electric motor 910, such as that in the powered trailer 110, is more efficient than an internal combustion engine (ICE), such as that in a target vehicle 410.

As shown, the powered trailer 100 may comprise at least one housing 460, which may be a single housing or several housings configured to function in concert. The housing may then enclose at least a portion of the energy source 910 or ballast 900.

The housing 460 may have a size or shape selected based on characteristics of the target vehicle 410. As such, the housing 460 may have a height 470 based on a height 480 of the target vehicle 410 or a width 640 selected based on a width 650 of the target vehicle.

As discussed above, the powered trailer 100 may generally have a vertical orientation, and as such the height and/or width may be set to an ideal configuration based, for example, on the size of the target vehicle 410. Once such an ideal height and width are determined, the powered trailer 100 may then be provided with a relatively minimal depth. In this way, an inertial tensor for the powered trailer 100 may be in a vertical orientation. Similarly, a center of gravity of the powered trailer 100 may then be kept relatively high, resulting in a center of gravity above the point of stability in many embodiments.

Accordingly, as shown, the housing 460 typically has a depth 490 smaller than the height 470, and, as noted above, the drive mechanism 130 comprises wheels 140 on a single axle 160. As such, a location of a center of gravity 700 of the trailer 100 relative to the single axle 160 defines a lean angle for the at least one housing 460. The lean angle is then controllable by the controller.

In the embodiments shown, the lean angle may be defined by the fixation structure 120. For example, the fixation structure 120 may comprise at least one articulated arm 440, and typically two such arms. The articulation in the arm 440 may then be actuated in order to define the lean angle.

Similarly, in the embodiments shown, the location of the center of gravity 700 along the single axle 160 may define a roll angle for the at least one housing 460. The roll angle is then controllable by the controller. Such a roll angle may be defined by moving a movable ballast 900, as discussed in more detail below.

The movement of the center of gravity 700 relative to a single axle 160 of the powered trailer may be by controlling a lean angle or roll angle of the at least one housing 460, or it may be by providing at least one dynamic ballast mechanism for controlling a location of the movable ballast 900, thereby moving a center of gravity of the powered trailer 100. It is noted that in some embodiments, the at least one housing 460 (or a component of it) may itself be the movable ballast 900 for the dynamic ballast mechanism. Such an embodiment is shown, for example, in FIG. 7 and schematically in FIG. 8.

Accordingly, the at least one dynamic ballast mechanism may move the center of gravity 700 of the powered trailer 100 by moving the movable ballast 900. Such movement may be upon detection of acceleration or braking in the target vehicle 410. The movement of the movable ballast 900 may be controlled in a number of ways so as to properly locate the center of gravity 700 for the powered trailer 100 in order to increase the stability of the system and/or improve the ability of the trailer 100 to apply force at the fixation structure 120.

The dynamic ballast mechanism may also comprise a track 170 for retaining and controlling the location of the movable ballast 900. Such a track may be oriented in the direction of the single axle 160. As such, the dynamic ballast mechanism may move the center of gravity 700 of the powered trailer 100 in a direction of the single axle 160 along the track 170. The controller may, for example, actuate such movement of the movable ballast 900 upon detecting an upcoming turn.

Accordingly, in some embodiments, the fixation structure 120 may be utilized to define a lean angle of the powered trailer 100 as a whole, so as to locate the center of gravity 700 relative to and perpendicular to the axle 160. This may be by manipulating articulated arms, as discussed above. Separately, the dynamic ballast mechanism may move the center of gravity 700 of the powered trailer 100 in the direction of the single axle 160. As such, the center of gravity 700 may be moved in two distinct dimensions.

In some embodiments, the movable ballast 900 may be provided with a third degree of freedom, such that the center of gravity 700 may be moved in three dimensions. For example, as shown schematically in FIG. 8, the center of gravity may be moved along the lean angle of the housing 460.

As noted above, in some embodiments, the movable ballast 900 may be moved along the axle 160 in preparation for an upcoming turn. Such a turn may be detected by a navigation system, for example. Alternatively, the turn may be detected at the fixation structure 120 using the techniques discussed above to detect force differentials between the contact points 620, 630. Alternatively, or in combination with such techniques, AI and machine learning techniques combined with imaging may be used as well.

In some embodiments, the use of the ballast 900 to actively counterbalance forces on the target vehicle 410 may be applied to other contexts as well. For example, in a car accident, the powered trailer 100 may detect the same, and the powered trailer may then shift the ballast 900 such that the target vehicle 410 does not flip over. Other dynamic safety responses are possible as well.

In some embodiments, the chassis 110 is self-balancing. As noted above, a self-balancing configuration may improve the ability of the powered trailer 100 to work in terms of momentum transfers. As such, the trailer may monitor how forces are transmitted to the trailer at the fixation structure 120, as well as how such forces differ across different connection points 620, 630. The appropriate momentum shift may then be coordinated by changing the settings of one or more of the motor(s), wheel(s), traction mechanism, jet engine, or whatever motive power source is provided for the trailer, as well as, potentially, actuators for changing the center of gravity and/or center of effort of the trailer with respect to the center of gravity of the target vehicle 410.

Additional automatic adjustments may be implemented to improve balance or momentum during travel. Such adjustments may be through mechanical displacement of the trailer's mass relative to its "normal" or neutral position. In some such embodiments, the battery or battery/motor compartment may be slidable/adjustable dynamically to account for, e.g. centrifugal forces. In some embodiments, such adjustments may be through actuating the point(s) of connection relative to the CG of the trailer and/or the vehicle. Accordingly, the system may apply differential forces to "lift" and "push" with the right connection and "push down" and "pull" with the left connection, thus counteracting centrifugal force, while still providing "forward" power and, in some cases, knowing what the direction of "forward" means relative to the trailer axle.

Higher-order sensors may, in some embodiments, determine what the car in front is doing relative to the trailer. In some embodiments, the sensors may similarly determine what a vehicle behind the trailer is doing relative to the trailer/lead vehicle. Those sensors might not need physical connections between the vehicles/trailers, as the airflow sensor 500 either alone or in combination with a camera 510 may, in some embodiments, be sufficient. Such sensors may develop metrics related to momentum transferring in a particular noise or vibration mode. Similarly, metrics may monitor momentum transfer in the direction of travel or in a vertical plane.

In some embodiments, the powered trailer 100 includes at least one solar cell for charging the energy source 910.

In some embodiments, the at least one housing 460 comprises at least one air intake or air flow sensor 500, as noted above. Such an air intake then receives airflow from a wake of the target vehicle 410. Accordingly, as noted above, the size of the at least one housing 460 may be selected based on characteristics of the target vehicle 410, such that the air intake or airflow sensor 500 may receive an idealized wake. Accordingly, the air intake or airflow sensor 500 is typically located relative to the target vehicle 410 such that airflow passing the target vehicle is received by the air intake.

In some embodiments, the wake may be used to drive a power generator for generating power for the energy source. The airflow sensor 500 may then take the form of an air intake, or an independent air intake may then provide a motive force to the power generator for driving the power generator.

Alternatively, or in addition, the controller may derive a behavior of the target vehicle 410 based on sampled airflow at the at least one intake or airflow sensor 500. The airflow may further be evaluated by an airflow sensor 500 for the purposes of other data acquisition. Accordingly, the size and configuration of the powered trailer 100 may be optimized for one or both of power generation and data acquisition.

In some embodiments, the air intake or airflow sensor 500 may comprise turbines or propellers sticking out on each side at top corners. They may then either power the air or be powered by the air, either dynamically or as appropriate in a particular setting. The powered trailer 410 may typically sit in the airflow at all time, and therefore the sampling and/or manipulation of the airflow may be valuable. Such sampling may acquire information useful for gaining efficiency or useful for safety, monitoring weather, etc. The manipulation of airflow may then implement some efficiency gain. Further, in the context of convoying vehicles, as discussed below, such manipulation of the airflow may be used to push air to facilitate and cushion inter-vehicle momentum transfers.

Figure 10:
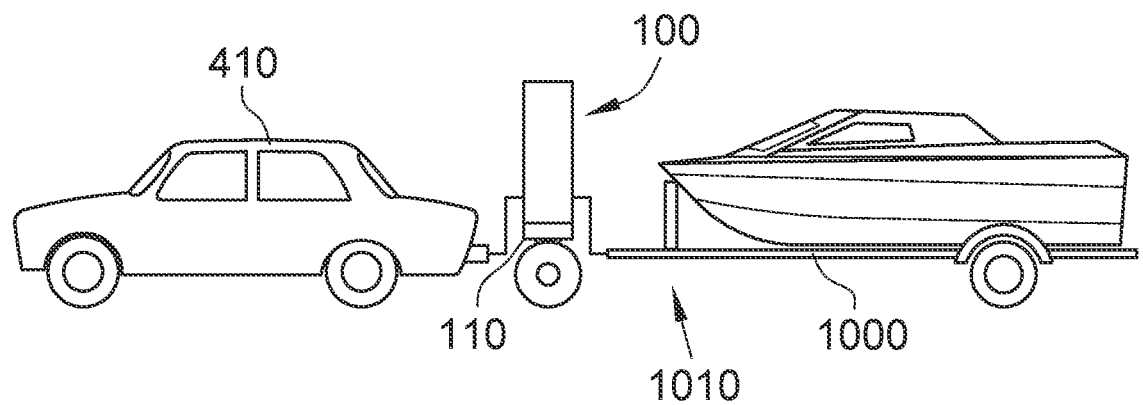
FIG. 10 is a drawing of a use of the powered trailer with a secondary trailer.

FIG. 10 is a drawing of a use of the powered trailer 100 with a secondary trailer 1000.

The powered trailer 100 typically corresponds to that discussed above in detail. Accordingly, the powered trailer 100 is discussed above in the context of various combinations of features, and a particular implementation can contain some subset of those features. In some embodiments, as shown, the powered trailer 100 may further include a trailer hitch 1010. The trailer hitch 1010 may then allow a secondary trailer 1000 to be fixed to the powered trailer 100.

Once fixed to the powered trailer 100, the secondary trailer 1000 may be pulled by either the chassis 110 of the powered trailer or the target vehicle 410 itself by way of the chassis. In this way, the system, taken as a whole, may be used to tow a secondary trailer 1000 regardless of whether the system is driven by the target vehicle 410 or the powered trailer 100 at any given time. Accordingly, the powered trailer 100 may be utilized to add significant towing capacity to a vehicle that may otherwise have no or little such capacity, such that, for example, a compact car may be used to tow a boat occasionally.

Figure 11:
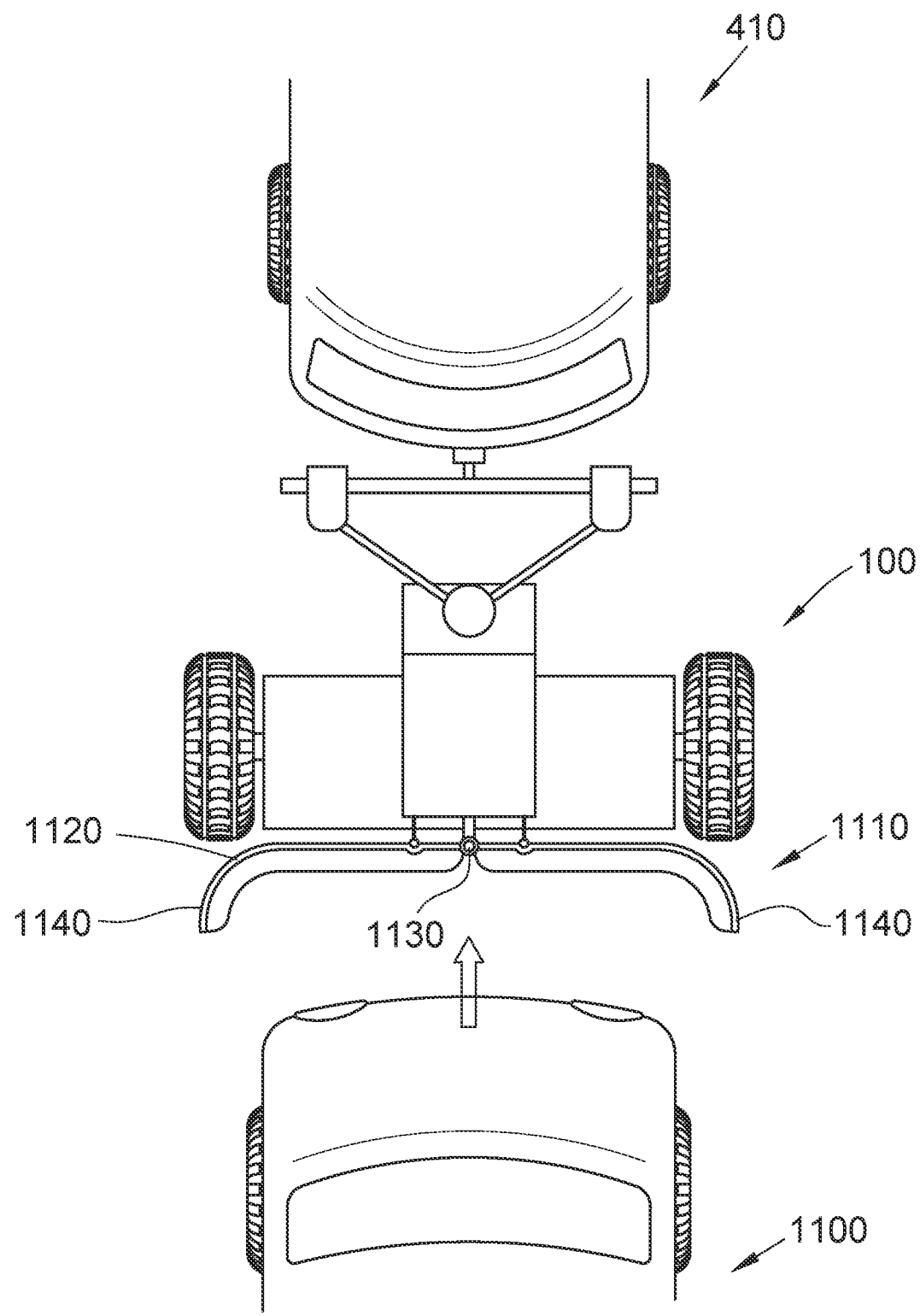
FIGS. 11 and 12 schematically illustrate the use of the powered trailer to grip a following vehicle in support of a convoy.
Figure 12:
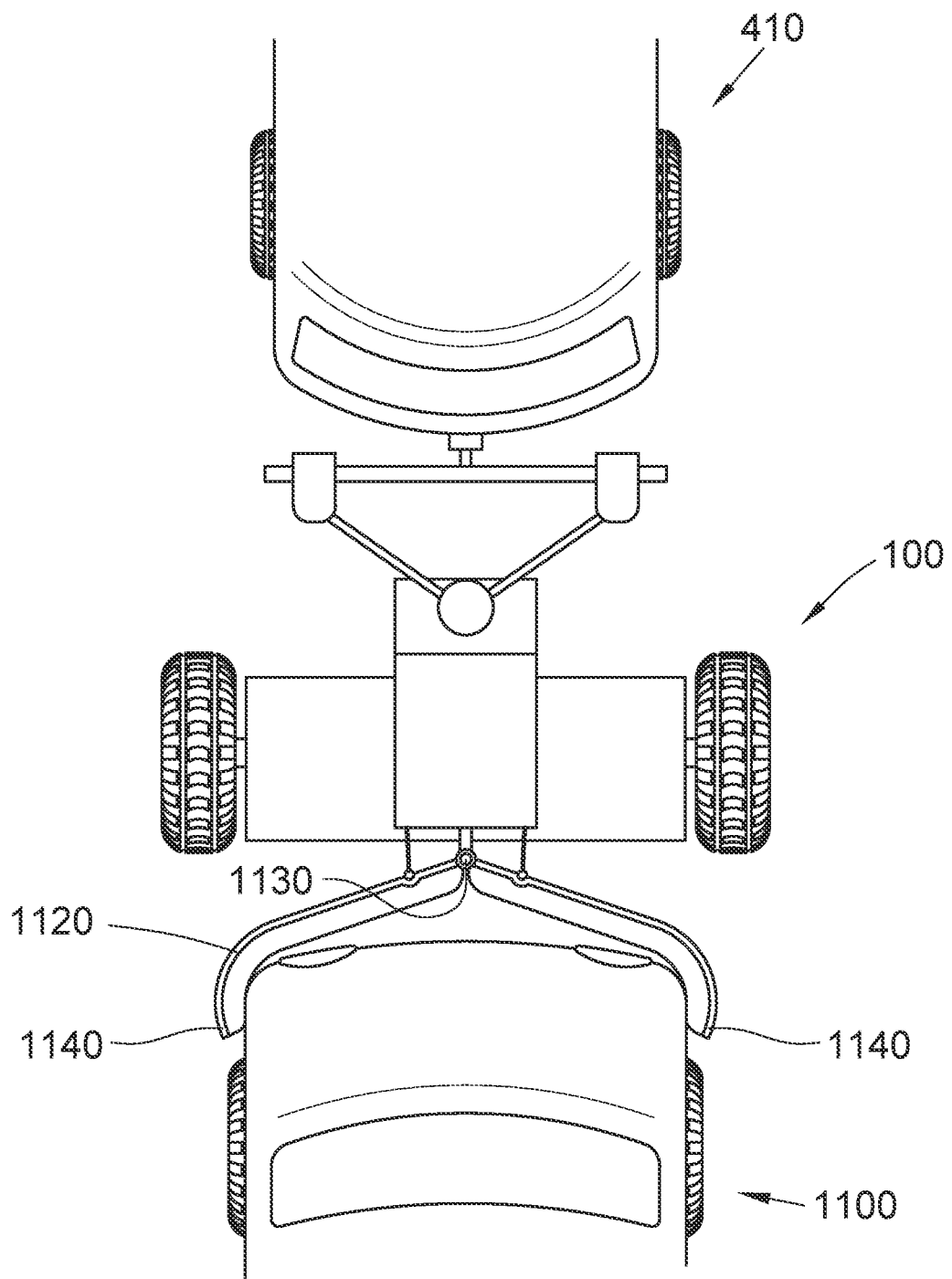
Figure 13:
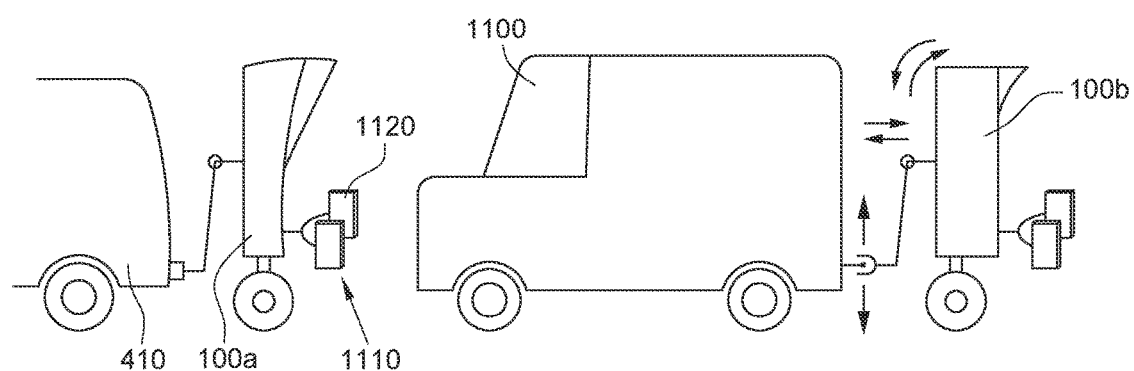
FIGS. 13 and 14 illustrate the use of multiple trailers and vehicles in the context of a convoy.
Figure 14:
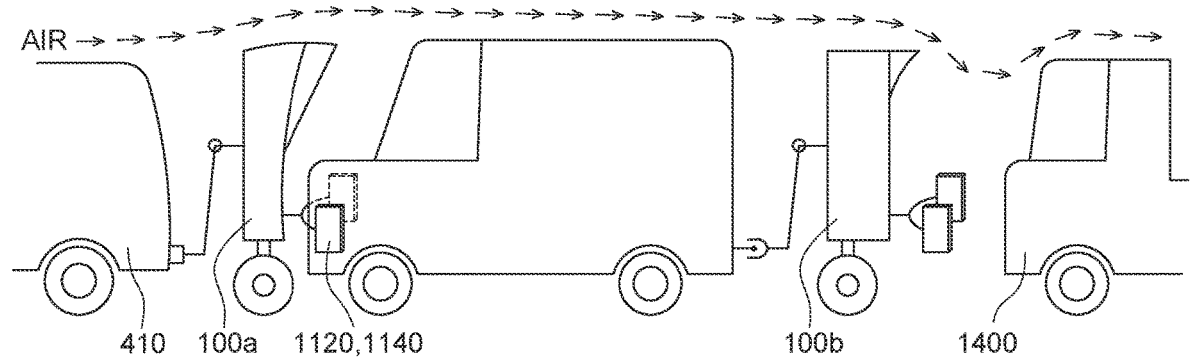

FIGS. 11 and 12 schematically illustrate the use of the powered trailer 100 to grip a following vehicle 1100 in support of a convoy. FIGS. 13 and 14 illustrate the use of multiple trailers 100a, 100b and vehicles 410, 1100, 1400 in the context of a convoy.

In various embodiments shown, the powered trailer 100 may be provided with a bumper 1110. Such a bumper 1110 can take various forms and may be used in various embodiments of the powered trailer 100 in different ways. In some embodiments, a bumper 1110 may simply soften impacts when a following vehicle impacts the powered trailer 100, as shown in FIGS. 1-3. In some such embodiments, the bumper 1110 may be configured to absorb the force of impact and either dissipate it or utilize it to generate energy. Such generation of energy may be, for example, by controlling a movement of the powered trailer 100 as a whole upon impact.

However, in the embodiment shown in FIGS. 11-14, the bumper 1110 further includes a gripping mechanism 1120 for gripping a following vehicle 1100. In such an embodiment, upon impact, the following vehicle 1100 may be gripped by the bumper 1110, thereby retaining the following vehicle 1100 in order to form a convoy. Such an approach may be in combination with the generation of energy upon impact, as noted above. Accordingly, in some embodiments, upon impact with the following vehicle, compensating force may be applied to the drive mechanism 130 in order to allow for power generation. Any power generated may then be added to the energy source 910.

The gripping mechanism 1120 may be implemented as the bumper 1110 itself. As such, the bumper 1110 may be a dynamic device configured to clamp a following vehicle 1100 upon impact. This may be by directly translating a force applied to a central point 1130 of the gripping mechanism 1120 to a clamping force as clamping elements 1140. In this way, an impact from a following vehicle 1100 may itself actuate the gripping mechanism 1120, thereby incorporating the following vehicle into the convoy.

As shown in FIG. 13, the following vehicle 1100 itself may then be provided with a second powered trailer 100b in addition to the first powered trailer 100a applied to the target vehicle 410. The second powered trailer 100b may then itself have a bumper 1110 and/or gripping mechanism 1120 which can be used to expand the convoy further to include additional vehicles 1400.

Accordingly, the various embodiments of the powered trailers 100 discussed above may be implemented in various combinations. The trailers 100 may all be similar, or they may be coordinated to provide different features. Accordingly, connections between vehicles and trailers may be provided in different ways. For example, the connections may be identical or symmetric, or they may be different but nestable. Similarly, powered trailers 100 may be identical, or some may be "middle trailers" or "end trailers" configured to be at different portions of convoys. Similarly, some connections may be gripping mechanisms 1120 for expanding a convoy, while others may be trailer hitches for pulling a traditional trailer 1000. In some embodiments, the hitch 1010 or other connection may be actuated and maneuvered relative to other components. As such, it may be raised or lowered, as well as moved out of the way for use of other connections.

In some embodiments, trailer information may be collected. Aside from the individual vehicle-with-the-trailer benefit, there are benefits in gross. Besides all the gross data harvesting (e.g. how are the trailers being used generally and where, and what are the local conditions there, etc.) that could be useful on an aggregated data center scale, there are potentially convoying benefits both in efficiency and simple practicality; safety benefits; efficiency benefits regardless of convoying; potentially could even help save the road surfaces (by redistributing weight of a heavy thing), provide extra traction when needed (ice, mud, military). If the trailers are everywhere, the value of being able to mass-coordinate otherwise separate actors is very useful for efficiency and again, other reasons. The ability to self-drive these power sources to a specific location might be incredibly useful for the military or another future non-transportation application.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A powered trailer comprising:
   a chassis;
   a fixation structure for fixing the chassis to a target vehicle to be pushed;
   a drive mechanism for applying motive force to the chassis;
   an energy source for powering the drive mechanism; and
   a controller for controlling the application of motive force to the chassis by the drive mechanism,
   wherein the drive mechanism is actuated by the controller to push the target vehicle,
   wherein the fixation structure comprises at least two contact points for contacting corresponding contact points of the target vehicle, and wherein the at least two contact points are spaced apart, and
   wherein the controller allocates force dynamically between the at least two contact points.

2. The powered trailer of claim 1 wherein the energy source is a battery.

3. The powered trailer of claim 1 wherein the energy source is a structural component of the chassis.

4. The powered trailer of claim 1 wherein the drive mechanism comprises at least one wheel driven by at least one motor.

5. The powered trailer of claim 4 wherein the at least one wheel is a plurality of wheels along a single axis.

6. The powered trailer of claim 5, wherein the drive mechanism comprises at least two wheels along a single axis, and where the controller allocates force by controlling the motive force applied by each of the at least two wheels independently.

7. The powered trailer of claim 1, wherein the fixation structure fixes the chassis to the target vehicle by way of a trailer hitch of the target vehicle.

8. The powered trailer of claim 7, wherein the fixation structure further comprises at least one rigid extension such that a component of the force applied by the fixation structure can be normal to the direction of travel.

9. The powered trailer of claim 1, wherein the fixation structure further comprises at least one shock absorber for absorbing momentum transfer between the chassis and the target vehicle.

10. The powered trailer of claim 1, wherein the drive mechanism is actuated by the controller based on a detected behavior of the target vehicle.

11. The powered trailer of claim 1, wherein the drive mechanism is actuated by the controller upon determining that the target vehicle is likely to maintain a constant speed.

12. The powered trailer of claim 2, wherein the drive mechanism is deactivated by the controller or actuated by the controller for deceleration upon determining that the target vehicle is likely to slow down.

13. The powered trailer of claim 12, wherein a rate of slowing is defined based on an evaluation of safety implications and projected actions of a driver.

14. The powered trailer of claim 10, wherein the controller determines the behavior of the target vehicle based on inertial changes detected at the fixation structure.

15. The powered trailer of claim 1, wherein the controller receives information by way of a communication interface comprising solely of a trailer hitch of the target vehicle.

16. The powered trailer of claim 1 further comprising a rear bumper for moderating allowed impacts between the trailer and a following vehicle.

17. The powered trailer of claim 1, wherein the controller derives a behavior of the target vehicle based on sampled airflow at at least one air intake.

18. The powered trailer of claim 1 further comprising at least one solar cell or mechanism for harvesting wind energy for charging the energy source.

19. The powered trailer of claim 1, wherein the chassis further comprises an airflow sensor for sampling airflow passing the trailer for data acquisition.

20. The powered trailer of claim 1, wherein the drive mechanism is actuated by the controller based on at least one signal generated by at least one sensor, suite of sensors, or camera mounted on the chassis.

21. A powered trailer comprising:
    a chassis;
    a fixation structure for fixing the chassis to a target vehicle to be pushed;
    a drive mechanism for applying motive force to the chassis;
    an energy source for powering the drive mechanism; and
    a controller for controlling the application of motive force to the chassis by the drive mechanism,
    wherein the drive mechanism is actuated by the controller to push the target vehicle, and
    wherein the actuation of the drive mechanism is at least partially based on a mass of the target vehicle and any load carried by the target vehicle.

22. A powered trailer comprising:
    a chassis;
    a fixation structure for fixing the chassis to a target vehicle to be pushed;
    a drive mechanism for applying motive force to the chassis;
    an energy source for powering the drive mechanism; and
    a controller for controlling the application of motive force to the chassis by the drive mechanism, wherein the drive mechanism is actuated by the controller to push the target vehicle, and wherein a location of a center of gravity of the trailer relative to a single axis of rotation for the drive mechanism defines a lean angle for at housing of the powered trailer, and wherein the lean angle is controllable by the controller.

23. The powered trailer of claim 22, wherein the fixation structure comprises at least one articulated arm, and wherein the at least one articulated arm is actuated to define the lean angle.

24. A powered trailer comprising:
a chassis;
a fixation structure for fixing the chassis to a target vehicle to be pushed;
a drive mechanism for applying motive force to the chassis;
an energy source for powering the drive mechanism;
a controller for controlling the application of motive force to the chassis by the drive mechanism; and
at least one dynamic ballast mechanism for moving a center of gravity of the powered trailer,
wherein the drive mechanism is actuated by the controller to push the target vehicle.

25. The powered trailer of claim 24, wherein the at least one dynamic ballast mechanism moves the center of gravity of the powered trailer upon detecting acceleration or braking in the target vehicle.

26. A powered trailer comprising:
a chassis;
a fixation structure for fixing the chassis to a target vehicle to be pushed;
a drive mechanism for applying motive force to the chassis;
an energy source for powering the drive mechanism; and
a controller for controlling the application of motive force to the chassis by the drive mechanism,
wherein the drive mechanism is actuated by the controller to push the target vehicle, and
wherein the fixation structure is a rigid structure comprising at least two contact points for contacting the target vehicle, and wherein the at least two contact points are spaced apart, and wherein a detection of an upcoming turn is based on a force differential between the two contact points.

27. A powered trailer comprising:
a chassis;
a fixation structure for fixing the chassis to a target vehicle to be pushed;
a drive mechanism for applying motive force to the chassis;
an energy source for powering the drive mechanism; and
a controller for controlling the application of motive force to the chassis by the drive mechanism,
wherein the drive mechanism is actuated by the controller to push the target vehicle, and
wherein the chassis is self-balancing.

\* \* \* \* \*